May 19, 1936.  O. S. FLATH  2,041,055
PARKWAY CABLE OUTLET
Filed Aug. 30, 1933  5 Sheets-Sheet 1
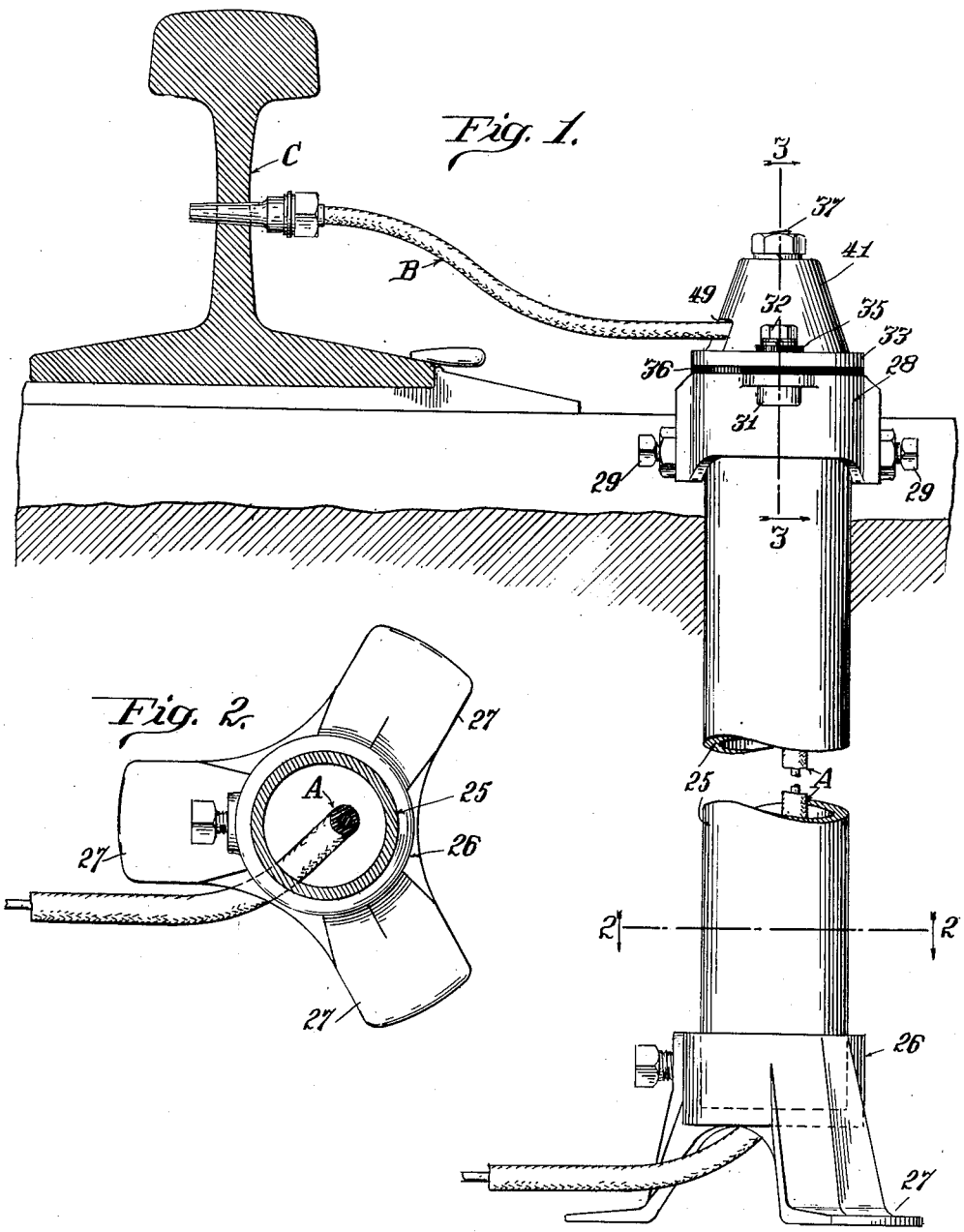

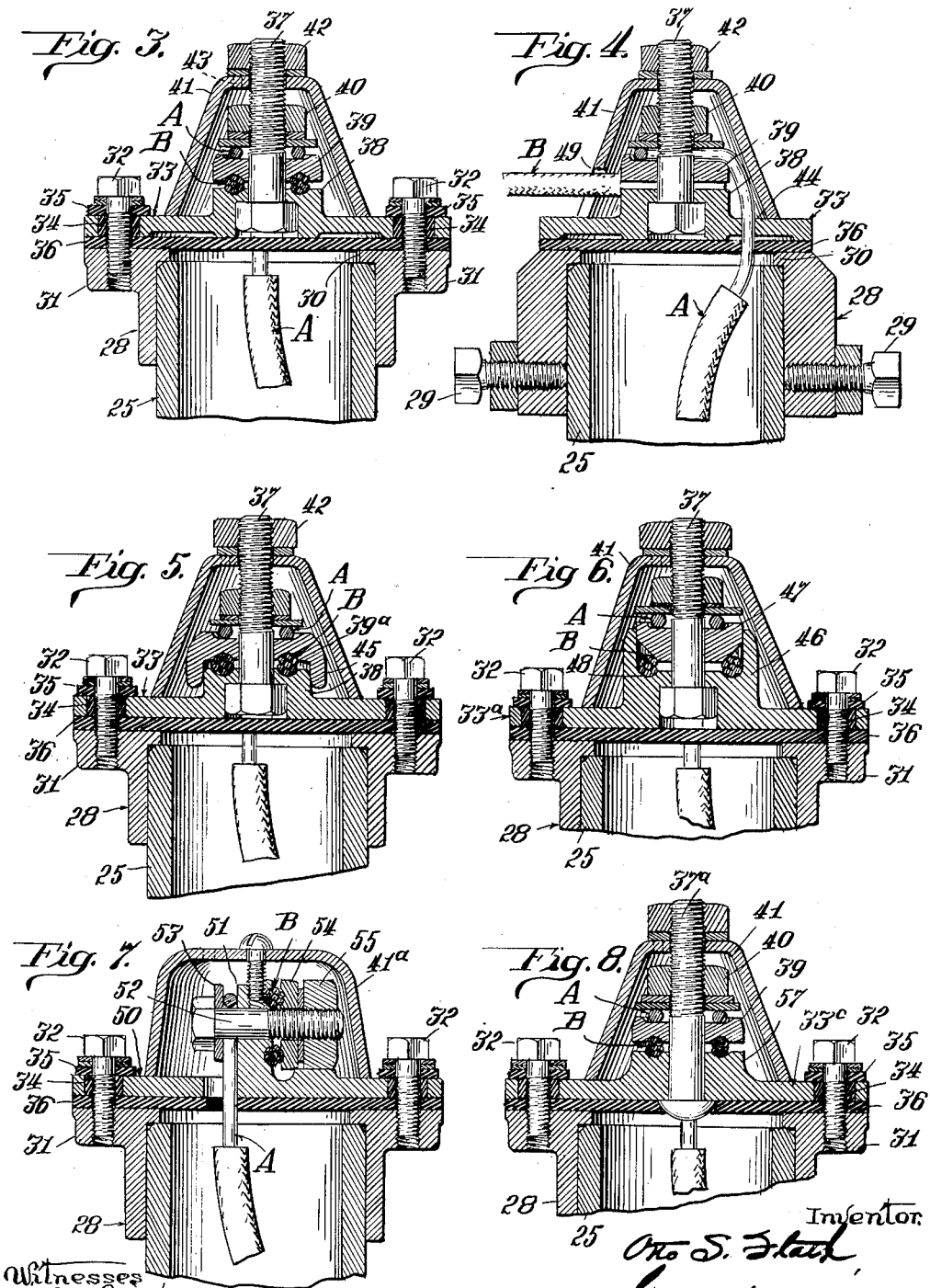

May 19, 1936.  O. S. FLATH  2,041,055
PARKWAY CABLE OUTLET
Filed Aug. 30, 1933  5 Sheets-Sheet 3
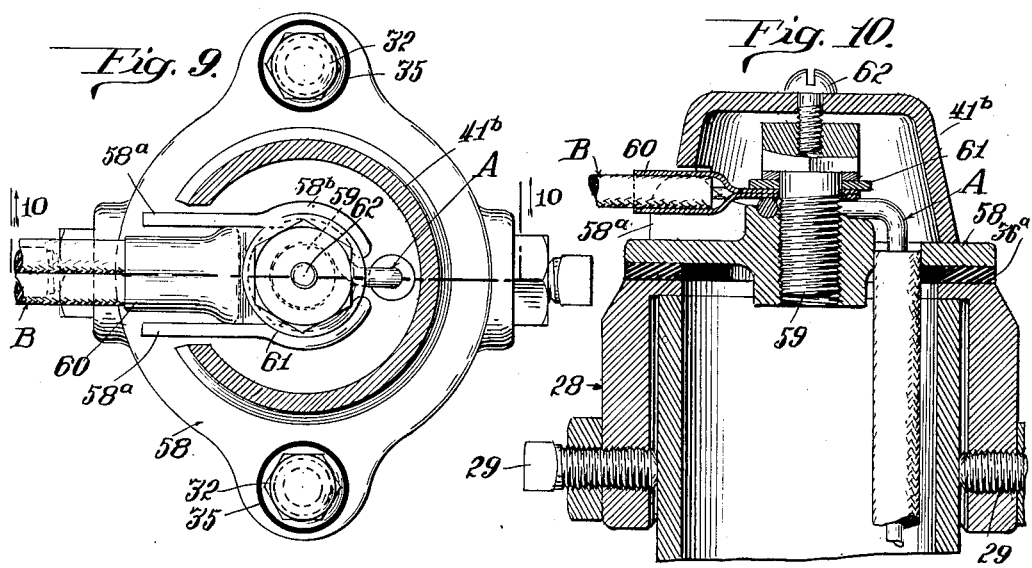
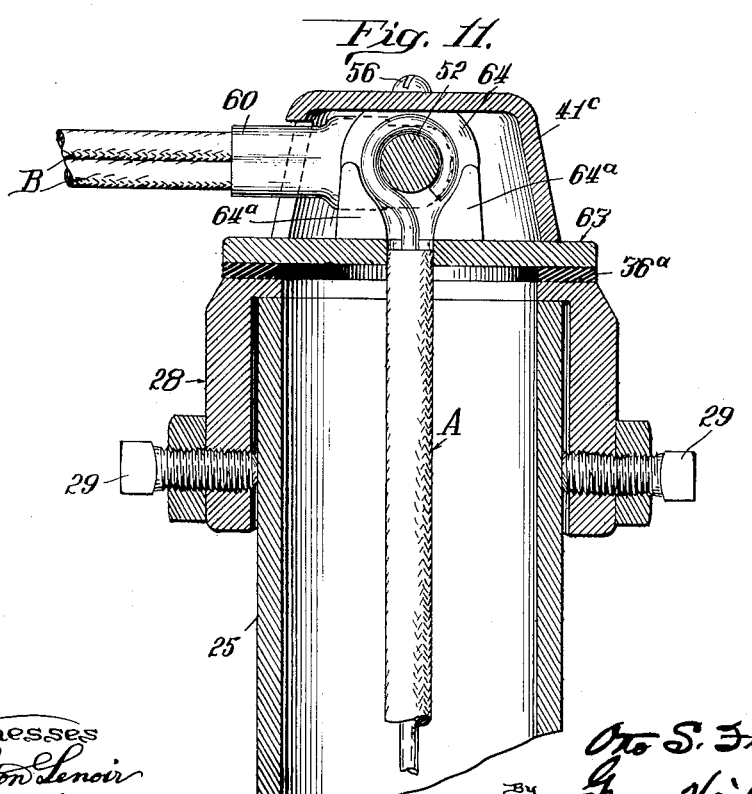

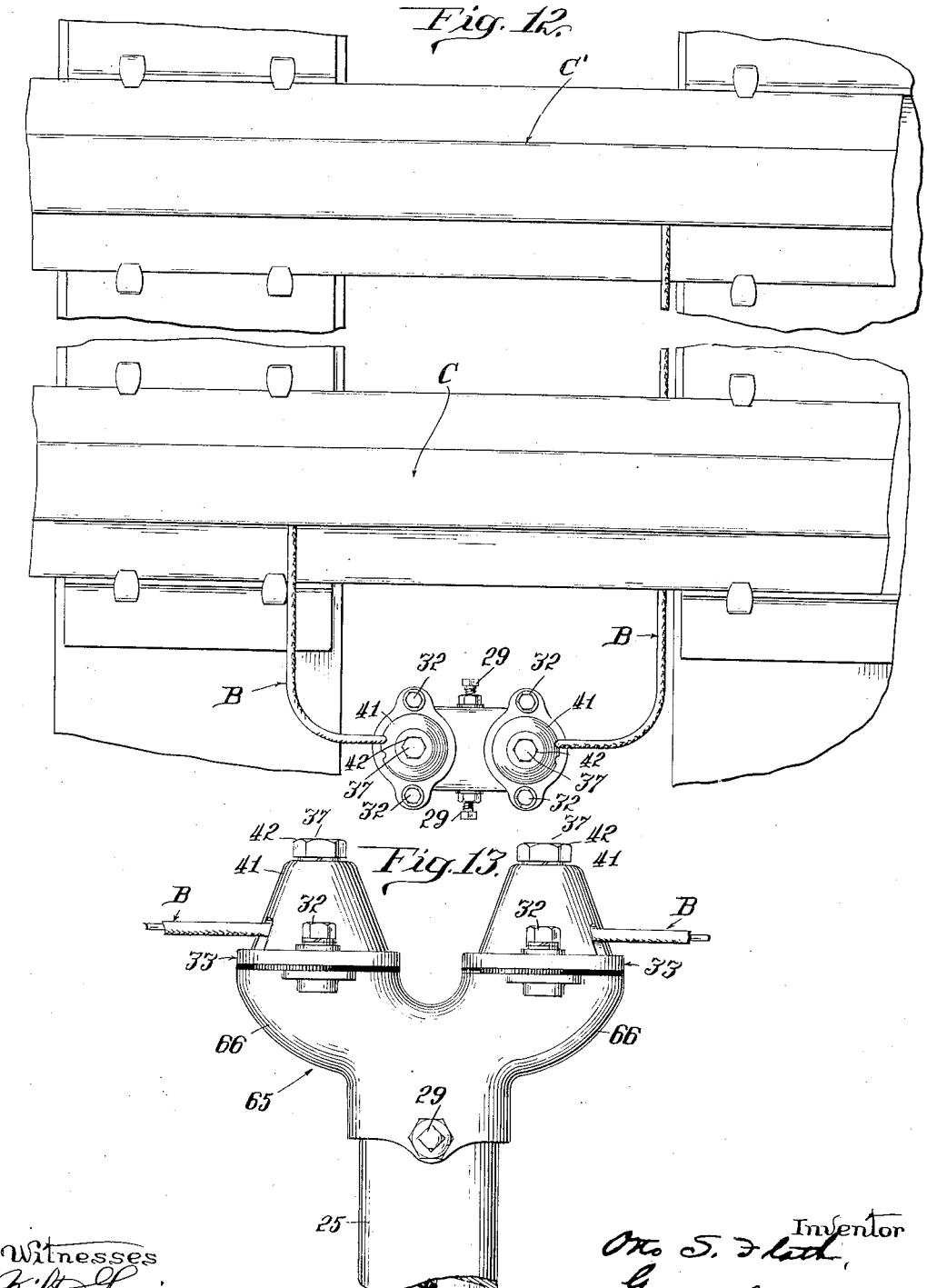

May 19, 1936. O. S. FLATH 2,041,055
PARKWAY CABLE OUTLET
Filed Aug. 30, 1933 5 Sheets-Sheet 5
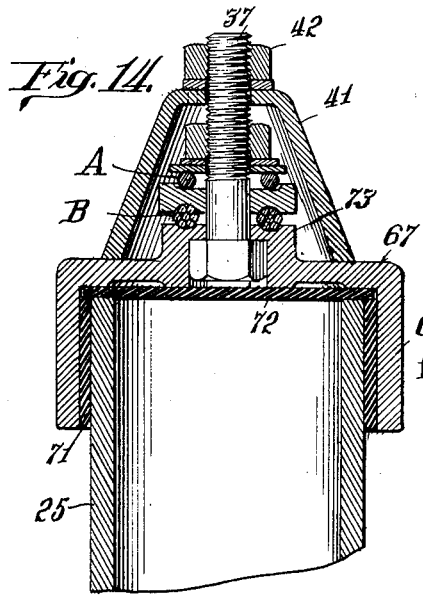
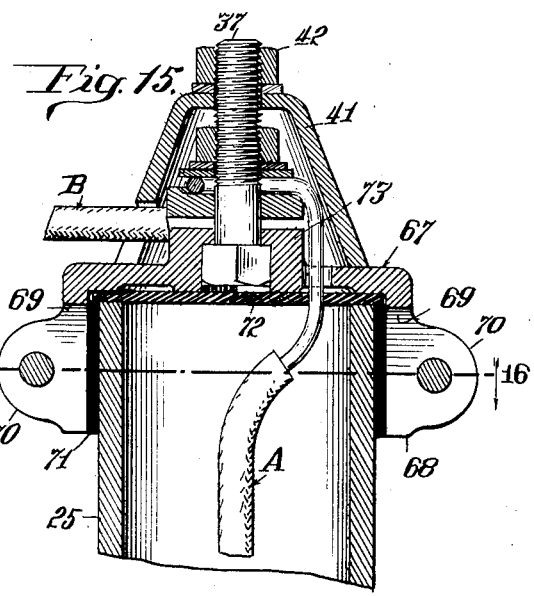
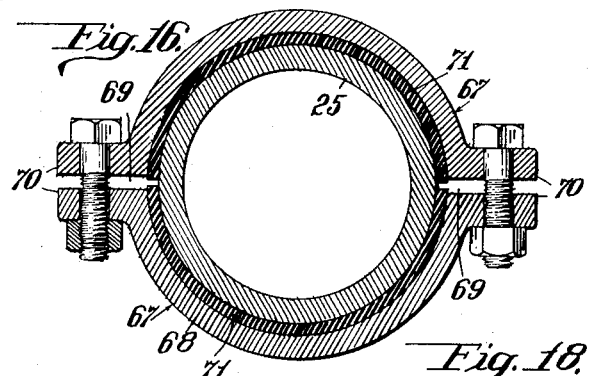
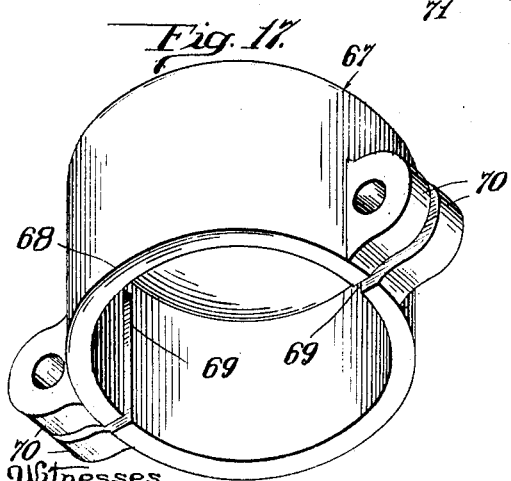
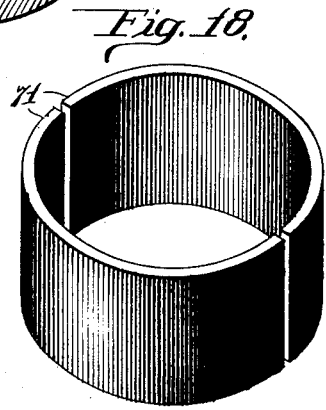

Patented May 19, 1936

2,041,055

UNITED STATES PATENT OFFICE 2,041,055

PARKWAY CABLE OUTLET

Otto S. Flath, Chicago, Ill., assignor to Electa M. Flath, Chicago, Ill.

Application August 30, 1933, Serial No. 687,445

6 Claims. (Cl. 247—1)

My invention relates especially to parkway cable outlets for use in connection with the current conducting cables employed by railroads along the right-of-way; the outlets being intended to receive the end of a cable leading from some distant point as well as the ends of the track wires and to effect electrical connection between the cable wire and the track wires.

The invention generally stated involves a suitable supporting element or hollow stand adapted to be, at least partially, sunk or buried below the surface; the stand or support being formed to receive the end of the cable therein; a suitable top plate provided with a single control bolt for receiving and holding the ends of the cable-wire and track leads or wires in place, as well as for receiving means whereby electrical relation between the wires is effected; together with means whereby the top or conductor plate is preferably insulatedly secured to the supporting element or stand.

The various exemplifications are such that ready access to the various elements may be had when occasion requires.

The objects and advantages of my invention will be readily comprehended from the detailed description of the accompanying drawings, wherein—

Figure 1 is a side elevation of a support or stand (buried in the ground) with an intermediate portion broken away and a track wire shown connected with a rail which latter is in section.

Figure 2 is a cross sectional view taken substantially on the line 2—2 of Figure 1 looking in the direction of the arrows.

Figure 3 is a vertical sectional view taken substantially on the line 3—3 of Figure 1.

Figure 4 is a similar view taken at right angles to the view in Figure 3.

Figure 5 is a sectional view similar to Figure 3, showing a modified form of outlet means.

Figures 6 and 7 are similar sectional views, each illustrating a different modification.

Figure 8 is a detail sectional view of another modification of the type of conductor plate and wire attaching means shown in Figure 3.

Figure 9 is a sectional plan of another modification of outlet with the track wires shown provided with an eyeletted thimble.

Figure 10 is a vertical sectional view taken substantially on the line 10—10 of Figure 9, looking in the direction of the arrows.

Figure 11 is a vertical sectional view of another form, with a portion of the supporting standard shown and illustrating more particularly a modification of the form shown in Figure 7.

Figure 12 is a plan view, with portions broken away, illustrating use of a duplex unit in conjunction with a pair of track rails.

Figure 13 is a side elevation of the duplex unit secured to the supporting standard of which merely the upper end is shown.

Figure 14 is a sectional elevation of the upper end of a standard and a modified form of the outlet.

Figure 15 is a similar view taken substantially at right angles to Figure 14.

Figure 16 is a cross sectional view taken substantially on the line 16—16 of Figure 15.

Figure 17 is a perspective view of the top unit shown in Figure 14.

Figure 18 is a perspective view of the insulating element or sleeve employed in Figure 14.

My improved cable outlet involves a suitable support or stand on which the outlet head is removably mounted. An exemplification of such support is disclosed in Figures 1 and 2 and may comprise a pipe section as at 25, shown secured to a separate supporting standard 26 provided with leg-portions preferably terminating in laterally disposed feet as shown at 27.

The support is usually buried in the ground as shown; the laterally disposed feet affording suitable anchorage; and the spacing between the leg and foot portions permits insertion of the cable A which leads from a source of current supply.

The upper end of the support preferably extends slightly above the ground and is provided with my improved outlet head whereby current from cable A is conveyed, by means of the conducting or lead wire B, to the rail shown at C.

My improved outlet head, as exemplified in Figures 1, 3 and 4, involves a sleeve member 28 adapted to telescopically fit the upper end of the support 25; the sleeve 28 at diametrically opposite points being preferably slightly enlarged as shown in Figure 4 to receive the set-screws or bolts 29 whereby the sleeve is firmly clamped in place; the upper end of the sleeve being shown with an inturned flange at 30 which overlaps the end of the stand and prevents downward movement of the sleeve. The sleeve is also provided with laterally disposed lobes 31 provided with tapped openings to receive the bolts 32 whereby a conductor or top plate 33 is secured in place; the bolt-receiving openings in the top plate 33 being of size sufficient to receive the insulating sleeves 34 while the top of the plate is provided with insulating washers 35, whereby the bolts are held out of contact with the plate.

The top plate 33 is held out of contact with the sleeve 28 by an insulating washer 36.

This insulating washer 36 is preferably in the nature of a disc so as to be substantially coextensive with the lower face of the conductor plate 33; the insulating washer having openings for passage of the bolts 32 whereby the washer is held in place. The insulating washer or disc also constitutes a means for initially retaining an assembly bolt 37, which is inserted from the underside of the top plate 33, during assembly of the conductor plate and the insulator washer or disc on top of the sleeve member 28 and stand; the bolt 37 being inserted upwardly so that its head will rest on the insulating washer during the initial assembly of the device, namely before the various wire clamping elements are screwed onto the bolt. The top plate 33 is centrally provided with an upstanding portion or boss 38 socketed on the lower side to receive the head of the bolt 37; the socket preferably corresponding to the shape of the bolt-head so that rotation of the bolt will be prevented. The upper surface of the boss formation 38 on opposite sides of the bolt receiving opening therein is preferably provided with one or more grooves to receive the end or ends of the rail wires B. Disposed on top of the ends of the rail wire B is a conductor plate or element 39 preferably correspondingly grooved on its lower face to receive the ends of the rail wires and centrally apertured to permit passage of the bolt 37 therethrough. The upper face of this conducting plate 39 is preferably slightly dished as shown to receive the bent or looped end of the wire of cable A; and this wire is firmly held in contact with the conductor plate or element 39 by suitable washer and nut as at 40.

As nut 40 screws onto bolt 37, it causes the head of the bolt to be drawn firmly into the socket of the boss formation 38 of top plate 33 and effects a firm clamping relation between the stranded rail wire B and conductor plates or elements 33 and 39 and between the trenchlay or cable-wire A and conductor plate or element 39 and the washer thereabove; the conducting plates or elements 33 and 39 being of bronze or other suitable conducting material.

Disposed over the entire assembled mechanism is a hood or cap 41 apertured in its top for passage of the end of the control bolt 37 therethrough; the cap 41 being firmly held in place by lock washer and nut as at 42. The cap or hood 41, in addition to the central bolt receiving opening, may also be provided in its top with an opening as at 43, in order that a moisture-proof sealing compound may be introduced before the lock washer and nut 42 are put into place; the opening 43 being preferably so positioned that it will be covered by the lock nut, as shown in Figure 3. As is apparent from the construction shown, the clamping or holding of the respective wires, as well as the holding of the cap or hood are all effected by means of a single bolt which provides a very desirable connecting cable outlet arrangement, possessing proper strength, while also affording good protection against dragging equipment moving along the track. It will be understood that the conductor plate 33 at one side of the upstanding boss formation 38 is provided with a suitable opening at 44 for passage of the cable or trenchlay wire therethrough and likewise the insulating washer or disc 36 is also apertured at a registering point to permit passage of the cable-wire.

In Figure 5 I illustrate a modification insofar as the contact element 39ᵃ is concerned. The conducting element 39ᵃ, like element 39, is intended to firmly clamp the track wires B onto the boss of top plate 33 and to receive the trenchlay wire B on its upper dished surface as heretofore described in connection with element 39. In this modification the conducting element 39ᵃ has depending flange portions 45 adapted to contact with the sides of the upstanding boss formation 38 of top plate 33.

In Figure 6 the sleeve 28, insulating washer 36, cap or hood 41 and main control or connecting bolt 37 are all similar in construction and arrangement to the constructions heretofore described. In this embodiment, the conducting or top plate 33ᵃ is provided centrally with an upstanding enlargement or boss portion 46 socketed on the lower side to receive the head of bolt 37, while the upper surface of the enlargement or boss 46 is provided with a recess or depression to not only receive the end or ends of the track wire or wires B, but also to receive the conducting element 47 therein or substantially so. The conducting element 47 is shown beveled at its opposite lower edges so that a firm wedging action on the track wires B may be effected and the latter caused to be wedged or forced into the grooves 48 formed in the bottom of the depression in the boss or enlargement 46. The element 47, as previously stated, is intended to be of suitable conducting material, such as bronze and the like, and its upper surface, like the conducting elements heretofore described, is preferably dished to receive the bent end of trenchlay wire A, the latter being suitably clamped in contact with element 47 by the lock-washer and nut 40 as heretofore described.

All of these elements are disposed about the main control bolt 37 which also is intended to firmly hold the hood or cap 41 in place when nut 42 is screwed thereon. The conductor elements 39, 39ᵃ, 47 may have threaded openings to receive the control bolts, or they may loosely fit onto the bolts; the latter method being employed if the boss 38 in Figure 5 is angular in cross-section so that the depending flange 45 may contact with the flat sides of the boss and prevent rotation of the element 39ᵃ; or if the socket in the enlargement 46 of Figure 6 is angular.

In the modifications shown in Figures 5 and 6, the insulation washers or discs, like in Figures 3 and 4, constitute means for initially holding the control or main bolts in place; and the vertically disposed bolts 37 not only constitute a part of the contact effecting means between trenchlay wire and track leads or wires, but also constitute the medium whereby the hood or cap is secured in place; it being understood that the hood or cap 41 in each instance is provided with a suitable opening in one side as at 49 in Figure 1 for the lead or track wires B.

In Figure 7 another modification is shown wherein a similar sleeve 28 is secured to the standard 25; and an insulating washer or disc 36 placed on top the sleeve so as to insulate the top or conductor plate 50 from the standard or sleeve. The conductor plate 50 is provided with an upstanding rib or flat-sided enlargement 51; and at the base of this enlargement the plate is provided with a hole for passage of the cable-wire therethrough.

The enlargement 51 is provided with a transverse hole to receive the horizontally disposed bolt 52, whose one end is adapted to clamp cable-wire A against one side of enlargement 51 by means of washer 53; while the ends of the lead or track wires B are clamped against the opposite face or side of enlargement 51 through the medium of the clamping element 54 and the lock washer and nut shown at 55, all of which are threaded on the control bolt 52. In this construction, the hood or cap 41ª is clamped in place by screw 56 passing through the top of the cap and screwing into a threaded hole in the enlargement 51.

In Figure 8 I illustrate a construction substantially similar to that of Figure 3, employing a sleeve 28, insulating washer or disc 36, similar to those of Figure 3; and employing a single control bolt 37ª which may be similar to a stove or carriage bolt and provided with a square shank and dome head; the square shank passing through a square hole in the contact plate 33ᶜ which is provided with a boss 57, which in this instance is not socketed on the bottom, thus causing the dome-head of the bolt to be disposed on the lower side of the conductor plate 33ᶜ.

The insulating washer or disc 36, in addition to having a hole for passage of trenchlay wire A therethrough, at a point coincident with the dome head of bolt 37ª, is provided with a hole smaller than the bolt-head and adapted to partially receive the dome head of the bolt, without permitting passage of the bolt-head entirely therethrough.

The insulating washer or disc therefore also constitutes means for maintaining the bolt in place during initial installation and subsequent applications of wires to the bolt. It will be understood that the various elements of my improved outlets are more or less of uniform size, the insulating washers or discs 36, which are formed by a single die, being substantially the same diameter as the top plate, causes the washers to extend flush with the bottoms of the plates, and therefore the method of holding bolt 37ª as above described is employed.

In Figures 9 and 10 another form is shown wherein the sleeve 28 secured to standard 25 is as heretofore described, with radially disposed lobes to receive bolts 32 for securing the top plate 58 thereto with an insulating washer 36ª therebeneath.

The top plate 58 is shown with a central boss or enlargement having a threaded opening to receive the central bolt 59; the upper face of the enlargement being adapted to receive the end of cable-wire A which extends through a hole in the plate adjacent to the enlargement. In this construction, the end of the track wire is shown provided with a thimble 60 having an apertured flattened end for passage of bolt 59 therethrough. The thimble 60 may be arranged in immediate contact with the end of the cable wire as shown, in which case the plate 58 need not be of bronze or other good conducting metal, but may be of a less expensive type, because direct contact between both wires is effected.

The thimble 60 is held in tight contact with the cable-wire by means of washer 61 and the head of bolt 59 when the latter is sufficiently screwed into the enlargement. The head of bolt 59 is provided with a threaded hole adapted to receive screw 62 whereby the hood or cap 41ᵇ is secured in place; the cap in its side having a suitable opening for passage of the thimble 60 and the track-wire B.

In order to prevent twisting or sidewise swinging movement of the track wire, or a twisting of the thimble 60 when the bolt 39 is screwed down tightly, the top plate 58 is shown provided with a pair of upstanding ribs or wings as at 58ª which extend laterally from the side of the central enlargement of the plate to receive the track wire B and thimble 60 therebetween. The top of the central enlargement of the plate, like in previously described constructions, is slightly depressed about the bolt-receiving opening and within the perimetrical boundary of the enlargement so that the end of the trenchlay wire A will lie within this socketed portion and the perimetrical upstanding boundary or edge of the enlargement will prevent the coiled end of the wire from spreading outwardly. The wings 58ª may be made continuous with the perimetrical boundary or ridge portion 58ᵇ, as shown in Figure 9, if desired.

Figure 11 illustrates a modification of the form shown in Figure 7, wherein the plate 63 is provided with a vertical rib 64 which is transversely apertured to receive the horizontally disposed control bolt 52, like in Figure 7.

Bolt 52 is passed through the eyelet of the thimble 60 on the ends of track wires B; the thimble and cable-wire being suitably clamped in place by means of washer and nut as for example shown in Figure 7. The cap 41ᶜ is secured in place by screw 56, as in Figure 7.

The side of the vertically disposed rib or lug 64, which is intended to receive the coiled end of trenchlay wire A, is shown provided adjacent the bottom and on opposite sides of the wire receiving path with the shoulder portion 64ª formed to permit the wire to be bent about the bolt as shown and to receive the usual washer for holding the wire in snug contact with the side of the lug or rib 64, the shoulder 64ª preventing the bent or looped portion of the trenchlay wire from spreading laterally beyond the clamping means.

In Figures 12 and 13 I illustrate a duplex unit and the leads of two rails C, C'; the lead wire B of the left hand portion being connected with rail C, while the leadwire B of the right hand portion is connected with rail C'. The general construction of each half or portion of the duplex unit is substantially the same as the construction shown in Figure 3, each portion being independently insulated.

Insofar as the top plates 33, vertically disposed main control bolts 37, with nuts 42 whereby the hoods or caps 41 are held in place, these elements are the same as in Figure 3.

In this exemplification, the modification exists in sleeve member 65, which, like the sleeve member 28, has the lower portion telescoping the upper open end of the standard 25 and is secured thereto in any suitable manner as by the set screws 29. The upper end of sleeve member 65 is bifurcated to provide the two conductor plate holding hollow portions 66 each provided with laterally disposed lobes to receive the bolts 32 whereby the top plates 33 are secured in place. In this construction, the cable or trenchlay wire is provided with two leads, one to each top plate for supplying current to the track-wires B, B as in the construction shown in Figure 3.

In Figures 14 to 18, I illustrate a modification which involves a unit or single piece sleeve section and top plate formed so as to permit the same to be firmly clamped about the tubular upper end of the standard 25 through which the cable or trenchlay wire A extends upwardly for attachment to the top or conductor element or in current conducting relation with the elements thereon.

The top plate or element 67 is provided with a depending peripheral flange 68 adapted to receive the upper end of the standard 25. The peripheral skirt or flange 68, at diametrically opposite points, is shown vertically slit from the top toward the bottom as shown at 69, see Figure 17; while the outer surface of the skirt or flange 68, at opposite sides, is provided with a pair of lobes or apertured ears 70; a lobe or ear of each pair being arranged on each side of the slits 69, see Figure 17.

The lobes or ears are apertured as shown to receive transversely disposed bolts whereby the split skirt or flange 68 may be drawn or contracted into firm gripping relation with the standard 25.

In order, however, to prevent grounding of the current through the standard 25, I provide the semi-cylindrical bands of insulation 71 shown in detail in Figure 18. This insulation is intended to encircle the upper end of the standard 25, as shown in Figures 14, 15, before the element 67 is put into place. The insulating band may consist of a single piece and slit like the flange 68, but it is preferable to make the band in two sections as shown so as to permit proper contraction of the split skirt or flange 68; and therefore it is also preferable to employ a separate washer or disc 72 adapted to extend across the upper open end of the standard 25 and to rest on the standard and on the sectional band 71 as shown in Figures 14 and 15.

It is apparent that the wire receiving unit or conductor element will be completely insulated from the standard 25.

The element 67, like the top plate 33 in Figure 3, is shown centrally provided with an upwardly disposed enlargement 73 socketed on its lower side and apertured to receive the single control bolt 37, through the medium of which the trenchlay and track wires are electrically secured together, and whereby the hood or cap 41 is secured and held in place by means of nut 42 on the upper end of the bolt.

As is apparent from the construction, the insulation washer or disc 72 will prevent the bolt 37 dropping down into the standard 25 during assembly operations, namely until the respective nuts have been screwed into place. The socket or recess in the lower face of the enlargement 73, like in the constructions shown in Figures 3, 5 and 6, is of angular cross-section to receive the angular head of the bolt 37 and prevent rotation of the latter during the screwing of the nuts thereon.

I have disclosed various modifications of my invention, namely of a top plate or element for the upper open end of a cable stand and adapted to be removably secured in place; said top plate being provided with an opening for receiving a single control bolt which extends upwardly through the plate, is held against rotation and affords means whereby the ends of the respective wires may be clamped and maintained in electrical relation; said single bolt also providing means whereby a top or cap can be removably secured in place, and have described these modifications in terms employed for purposes of description and not as terms of limitation, as modifications are possible and may be made without departing from the spirit of my invention.

What I claim is:

1. A parkway cable outlet having a vertically arranged hollow stand and comprising a top plate provided with an upstanding apertured enlargement socketed on the bottom; a wire holding bolt disposed upwardly through the aperture in the enlargement with the bolt-head in the socket and held against rotation; means cooperating with the bolt for securing the cable-wire and track wires in conducting relation; and means adapted to be removably arranged between the stand and the top plate for insulating the latter from the former and to initially hold said bolt in place.

2. A parkway cable outlet comprising, in combination with the track wires and a conductor receiving hollow stand; a top plate for said stand provided with an opening and a bolt-head receiving socket in its lower face about the opening and having a circumferential depending split flange adapted to fit about the end of said stand; a single bolt disposed upwardly through the opening in the plate; insulating means disposed about the upper end and top of the stand and adapted to prevent the bolt dropping into the stand, a portion of said means being contractible; means whereby the flange is contracted into gripping relation with the stand; and current conducting means arranged on said bolt whereby current conducting relation between the track wires and the conductor is effected.

3. A parkway cable outlet comprising, in combination with the track wires and a cable receiving hollow stand; a top plate adapted to be secured on the upper end of said stand and provided with a bolt-head receiving socket; an upstanding bolt carried by said plate; current conducting means arranged on said bolt whereby the cable-wire and the track-wires are held in electrical relation; and a cap adapted to enclose the ends of the wires and said conducting means, the cap in its side having a passage for the track-wires while the top of the cap is adapted to receive an end of the bolt and to be held thereby.

4. A parkway cable outlet comprising, in combination with the track wires and a cable receiving hollow stand; a top plate provided with wire receiving surfaces and with a cable wire receiving opening, said top plate also being provided with a central opening, a single control bolt disposed upwardly through said central opening; means adapted to cooperate with said bolt whereby the track-wires and cable are held in conducting relation; a hood adapted to fit onto the top plate and to receive the upper end of the bolt therethrough; and means coacting with the end of the bolt whereby the hood is secured in place.

5. A parkway cable outlet comprising, in combination with the track wires, a cable and a hollow stand; a top plate for said stand provided with a cable wire receiving opening and with a central opening therethrough; a single control bolt disposed upwardly through said central opening; means adapted to cooperate with said top plate and with said bolt whereby the track-wires and the cable-wire are held in conducting relation; and a hood member adapted to fit onto the plate and enclose the ends of said wires, said hood member being removably held in place by said single control bolt.

6. In a parkway cable outlet involving a vertically arranged cable receiving hollow stand; a top plate adapted to fit onto the upper open end of the stand and provided with an upwardly disposed bolt holding enlargement, said top plate having a cable-wire receiving opening and a central opening through the enlargement; a cable wire disposed through said first mentioned opening; a pair of track wires; a single upstanding bolt removably mounted in said central opening through the enlargement; a conductor element disposed about the bolt intermediate of the cable wire and the track wires for effecting electrical connection therebetween, said element and said enlargement being provided with wire receiving and gripping surfaces; and means cooperating with the threaded end of the bolt whereby the respective wires and said conductor element are clamped in conducting relation on top of said enlargement.

OTTO S. FLATH.